United States Patent
Dyer et al.

(10) Patent No.: US 6,364,581 B2
(45) Date of Patent: Apr. 2, 2002

(54) BALANCER

(75) Inventors: Stephen William Dyer, Ann Arbor; Brian Kent Hackett, Saline, both of MI (US)

(73) Assignee: Baladyne Corporation, Ann Arbor, MI (US)

( * ) Notice: Subject to any disclaimer, the term of this patent is extended or adjusted under 35 U.S.C. 154(b) by 0 days.

(21) Appl. No.: 09/783,181

(22) Filed: Feb. 8, 2001

Related U.S. Application Data

(63) Continuation of application No. 09/168,523, filed on Oct. 8, 1998, now abandoned.

(51) Int. Cl.[7] .............................................. B23B 47/00
(52) U.S. Cl. ...................... 409/131; 74/573 R; 408/8; 408/143; 409/141; 409/234
(58) Field of Search .................. 408/8, 9, 143, 408/1 R; 409/131, 141, 232, 234; 279/132, 126; 74/573 R; 700/279; 702/56; 451/343

(56) References Cited

U.S. PATENT DOCUMENTS

| | | |
|---|---|---|
| 3,861,025 A | 1/1975 | Sims |
| 4,319,151 A | 3/1982 | Klotz |
| 4,340,948 A | 7/1982 | Goodnight |
| 4,432,253 A | 2/1984 | Kerlin |
| 4,550,428 A | 10/1985 | Yanagishima et al. |
| 4,626,147 A | 12/1986 | Nystuen et al. |
| 4,684,944 A | 8/1987 | Kerlin |
| 4,817,003 A | 3/1989 | Nagase et al. |
| 4,951,526 A * | 8/1990 | Linder ...................... 74/573 R |
| 4,983,915 A | 1/1991 | Rossi |
| 5,074,723 A | 12/1991 | Massa et al. |
| 5,144,862 A | 9/1992 | Giberson et al. |
| 5,161,414 A | 11/1992 | Rubbelke |
| 5,168,187 A | 12/1992 | Baer et al. |
| 5,172,325 A | 12/1992 | Heidari |
| 5,263,995 A | 11/1993 | Mogilnicki et al. |
| 5,412,583 A | 5/1995 | Cameron et al. |
| 5,478,177 A | 12/1995 | Romi |
| 5,505,684 A | 4/1996 | Piramoon |
| 5,540,615 A | 7/1996 | Murtuza |
| 5,757,662 A | 5/1998 | Dyer et al. |
| 5,902,078 A | 5/1999 | Kaiser et al. |
| 6,236,934 B1 * | 5/2001 | Dyer et al. .................. 700/279 |

FOREIGN PATENT DOCUMENTS

| | | |
|---|---|---|
| DE | 3720746 C2 | 6/1987 |
| DE | 4337001 A1 | 10/1993 |

* cited by examiner

Primary Examiner—Daniel W. Howell
(74) Attorney, Agent, or Firm—Baladyne Corporation

(57) ABSTRACT

A tool holder assembly 10 including a tool holder 12 having a balancer assembly 21 adapted to selectively provide improved unbalance compensation.

7 Claims, 1 Drawing Sheet

BALANCER

This is a continuation of application Ser. No. 09/168,523 filed on Oct. 8, 1998, now abandoned.

BACKGROUND

1. Field of the Invention

This invention relates to a method and to an apparatus for balancing a spindle or other rotating machinery and, more particularly, to an improved tool holder including a balancer assembly portion which provides enhanced balancer capabilities over that provided by prior balancer assemblies.

2. Background of the Invention

A typical machine tool assembly includes a rotating spindle or other type of movable member which is normally adapted to selectively and removable receive and/or to be removably but securely coupled to a tool holder. The tool holder is itself adapted to removably and securely receive a tool in a manner which allows the tool to move in response to the movement of the spindle. As the tool moves it performs some desired operation upon some surface or body often referred to as a "workpiece". The machine tool assembly therefore normally includes the cooperative combination of the tool, the tool holder, and the rotating or moving spindle which form or "machine" the work piece into a "finished product" having a desired shape and configuration.

Typically, these machine tool assemblies experience a certain amount of unbalance and associated unbalance induced vibrations caused by the unbalance created by the wear and tear experienced by the tool and/or by a failure or "looseness" in the coupling between the tool holder and the tool and/or between the tool holder and the spindle.

These unbalance type vibrations oftentimes cause the tool to inaccurately perform the desired task (e.g. the desired cuts within the workpiece are not of a uniform and desired depth), significantly decrease the overall tool life, and cause the production of a finished product which must be discarded resulting in a concomitant and undesired waste of resources. Accordingly, it is highly desirable to maintain the tool, tool holder, and spindle in a state of relative balance, thereby increasing the overall working life of the tool, increasing the overall accuracy with which the tool performs its work, increasing the overall operating life of the balancer assembly and consistently creating finished products of a desired shape and size.

The Applicants have previously discovered and have previously patented a new and useful balancer assembly using several rotors which are selectively moved by means of at least one electromagnetic signal which selectively emanates and/or is generated from a driver. This electromagnetic balancer assembly is described and claimed within U.S. Pat. No. 5,757,662 (the '662 patent); filed on Nov. 29, 1994; issued on May 26, 1998; and assigned to these Applicant's Assignee. The '662 patent is fully and completely incorporated herein by reference, word for word and paragraph for paragraph.

While the balancer assembly described and claimed within the '662 patent provides for a highly desirable and highly efficient unbalance compensation, Applicants have recently discovered that this balancer assembly offers even improved and greater unbalance compensation performance if adapted for use upon and/or as an integral part of a tool holder, thereby providing a tool holder with an integrally formed balancer assembly and/or a balancer assembly removably placed upon the tool holder. In fact, Applicants have discovered that the placement of the balancer upon the tool holder provides for increased effectiveness of vibration balance and control since the balance compensating element is now positioned in relatively close proximity to the actual source of vibration (e.g. the tool and the tool holder). Moreover, Applicants have found that the placement of the balancer upon the tool holder provides for a more accurate overall balancing condition since the balance compensation is achieved very close to the unbalance condition. Heretobefore, prior unbalance compensators could not achieve these highly desirable results since these prior unbalance compensators were not capable of being adapted for placement upon the tool holders due to their size, geometric configuration, and/or their employed unbalance compensation methodology.

Accordingly it is a principal object of the present invention to provide a tool holder having balancer portion which is selectively adapted to provide desired and improved unbalance compensation for the tool, tool holder, and for the entire balancer assembly and which allows the amount of vibration to be accurately measured and which further improves the overall accuracy of the unbalance compensation which is selectively provided.

SUMMARY OF THE INVENTION

It is therefore a primary object of this invention to provide an improved method and apparatus for selectively and relatively quickly and efficiently balancing rotating machine apparatuses and other similar types of devices.

It is another object of this invention to provide an improved method and an apparatus which corrects a relatively large amount of vibration which is caused by rotating unbalance.

It is yet another object of the invention to provide an unbalance compensator which is adapted to be disposed upon and/or integrally formed within a machine tool holder and which is further adapted to selectively provide desired unbalance compensation.

According to a first aspect of the present invention a tool holder of the type adapted for use upon a spindle is provided. According to this first aspect of the present invention, the tool holder includes a generally elongated body having a tool reception portion which is adapted to removably receive a tool and an opposed spindle portion which is adapted to removably attach to a spindle; and a balancer which is adapted to selectively balance the tool and tool holder.

According to yet another aspect of the present invention a method of unbalance compensation is provided. The method includes the steps of providing a tool holder; providing a tool; placing the tool into the tool holder; providing a balancer; placing the balancer upon the tool holder; providing a spindle; placing the tool holder onto the spindle; rotating the spindle; measuring an amount of vibration caused by unbalance of the tool; and balancing the tool as the spindle is rotating, thereby providing compensation for at least a portion of the measured amount of rotating unbalance.

Further objects, features, and advantages of the present invention will become apparent from a consideration of the following description and the following subjoined claims when taken in conjunction with the attached drawings.

BRIEF DESCRIPTION OF THE DRAWINGS

Various advantages of the present invention will become apparent to those skilled in the art by reading the following specification and by reference to the following drawings

DETAILED DESCRIPTION OF THE INVENTION

Figure 1:
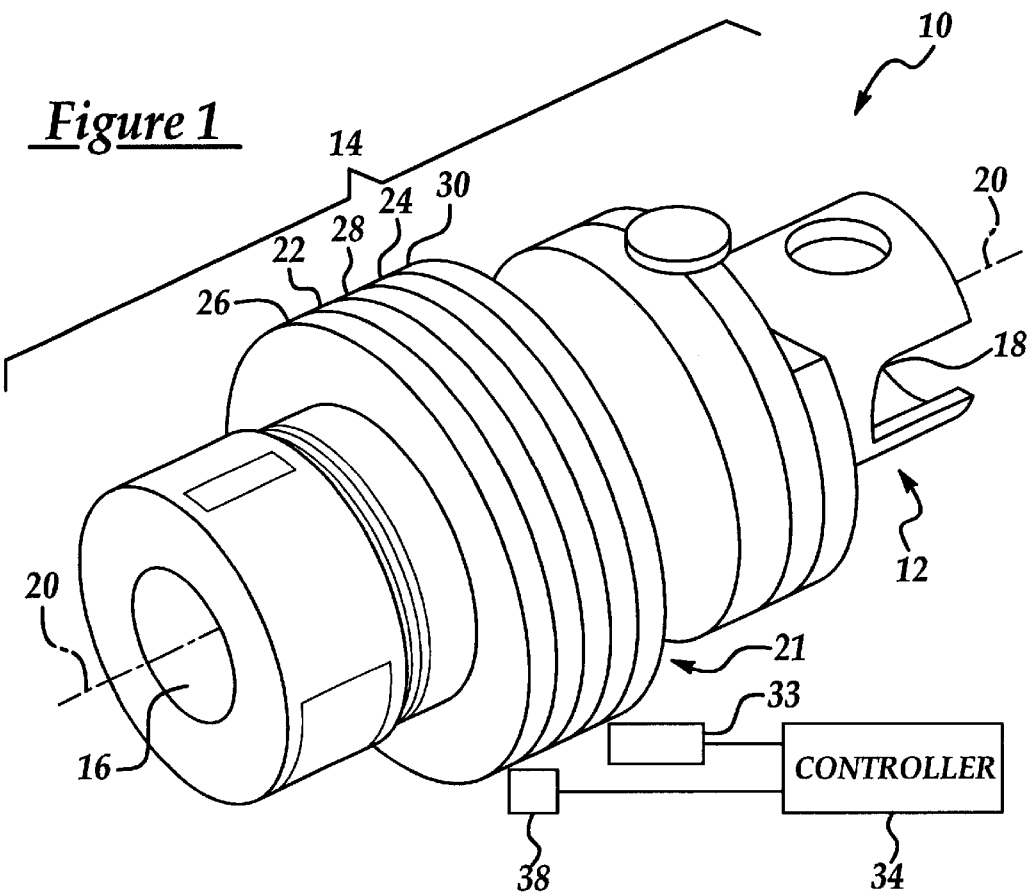
FIG. 1 is a perspective partial block diagrammatic view of a tool holder assembly made in accordance with the teachings of the preferred embodiment of this invention.
Figure 2:
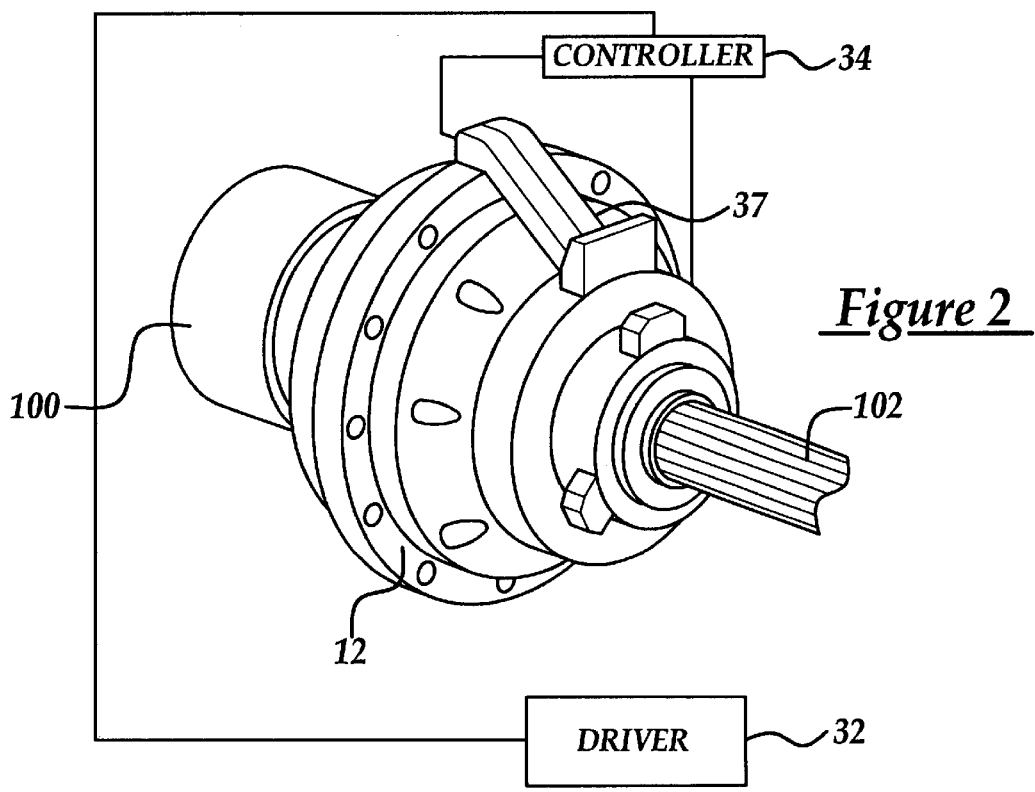
FIG. 2 is a perspective partial block diagrammatic view of a balancer assembly made in accordance with the teachings of the preferred embodiment of the invention.

Referring now to FIGS. 1 and 2, there is shown a tool holder balancer assembly 10 made in accordance with the teachings of the preferred embodiment of this invention. As shown, assembly 10 includes a conventional tool holder 12, such as and without limitation, those commercially available tool holders available from the Kennametal Corporation of Latrobe, Pa. (e.g. model KC100), having a generally elongated tubular body 14 with opposed end reception portions 16, 18 generally disposed along the longitudinal axis of symmetry 20 of the tool holder. Moreover, as shown best in FIG. 2, it should further be apparent to those of ordinary skill in the art that portion 16 is adapted to be selectively inserted into and secured into spindle 100 by known techniques while portion 18 is adapted to selectively receive tool 102. Tool 102 is secured within portion 18 by known fastening techniques. It should be apparent to those of ordinary skill in the art that other types of tool holders, other than the one shown in FIG. 1, may be utilized in accordance with the teachings of this invention. Additionally, in accordance with the teachings of the invention, the tool holder 12 includes a balancer assembly 21 which is substantially similar to the balancer assembly 110 shown and described within the '662 patent which has been previously fully and completely incorporated herein by reference, word for word and paragraph for paragraph. For example, assembly 21 is shown as assembly 110 in FIG. 1 of the '662 patent.

Assembly 21 includes selectively movable rotors 22, 24 which respectively correspond to and are substantially identical to rotors 350 and 351 of the balancer assembly 110 described within the '662 patent and further includes pole plates 26, 28, and 30 which respectively correspond to and are substantially identical to pole plates 330, 331, and 332 of balancer assembly 110. As shown best in FIG. 2, balancer assembly 21 further includes an electromagnetic field producing driver 32 which respectively corresponds to and is substantially identical to driver 120 described and shown in the '662 patent.

Moreover, balancer assembly 10 includes a controller 34 which is substantially similar to controller 140 shown and described with respect to FIG. 2 of the '662 patent. Importantly, controller 34 is physically and communicatively coupled to sensor assembly 33 having at least three Hall Effect type sensors substantially identical to sensors 2670, 2671, and 2672 of the '662 patent, to driver 32, and to a displacement, velocity, or acceleration transducer 38 which is substantially identical to transducer 2635 of the '662 patent which provides a signal indicative of the amount of vibration caused by unbalance.

Sensor 38 and sensor assembly 33 physically and communicatively connect to controller 34 by use of the interface module 37 which comprises a substantially hollow and closed container in which the various wires emanating from the sensors and the controller are physically coupled. Controller 34 further includes all of the other components shown and described with respect to FIG. 26 of the '662 patent including a microcomputer operating under stored program control which is substantially identical to microcomputer 2615 of the '662 patent.

In operation, as is fully and completely described within '662 patent, the controller 34 senses vibration by receipt of a signal from transducer 38. If the sensed vibration is greater then some threshold value, controller 34 energizes and/or pulses the driver 32 to cause rotors 22 and/or 24 to move to a new and different position in order to counterbalance the unbalance. The new position, as is fully and completely explained within '662 patent, is selected after recognizing the current position of the rotors 22, 24 by use of the sensor assembly 33. In this operation, the driver 32 is placed in relative close proximity to the balancer 12 so that the unbalance compensation can be achieved during the operation of the tool 102 or in an "in process" manner. Alternatively, the driver 32 may be located and/or positioned away from the balancer and spindle and the balance is achieved by placement of the tool holder 12 in close proximity to the remote driver 32 by use of spindle 100.

Applicants have found that the placement of the balancer assembly 21 upon the tool holder 12 provides for a more accurate and faster unbalance compensation then previously obtained. Importantly, it is believed that no prior "active" unbalance compensating assembly has ever been placed upon a tool holder and that the use of the balancer assembly 21 upon toolholder 12 allows for a more exact and precise unbalance correction in the manner and for the reasons previously discussed.

It is to be understood that the invention is not limited to the exact construction or method illustrated and described above but that various changes and/or modifications may be made without departing from the spirit and scope of the invention as set forth in the following claims.

What is claimed is:

1. A tool holder of the type adapted for use upon a spindle, said tool holder comprising a generally elongated body having a tool reception portion which is adapted to removably receive a tool and an opposed spindle reception portion which is adapted to receive said spindle, and a balancer which is disposed in relatively close proximity to a point of unbalance and which is adapted to automatically balance said tool holder while said tool holder is spinning.

2. The tool holder of claim 1 wherein said balancer comprises at least one rotor which is moveable with respect to the tool holder; and a driver which is adapted to selectively move said at least one rotor.

3. The tool holder of claim 2 further comprising a sensor adapted to determine an amount of unbalance associated with said tool.

4. A method of unbalance compensation comprising the steps of:

providing a tool holder;

providing a tool;

placing said tool into said tool holder, thereby creating a source of unbalance;

providing a balancer;

providing a spindle;

placing said tool holder onto said spindle;

coupling said balancer to said tool holder in relatively close proximity to said source of unbalance;

rotating said spindle;

measuring an amount of unbalance of said tool;

balancing said tool as said spindle is rotating, thereby providing compensation for at least a portion of said measured amount of unbalance.

5. A method of unbalance compensation comprising the steps of:

providing a tool holder having a certain amount of unbalance;

providing a tool;

providing a balancer;

placing said balancer upon said tool holder in relatively close proximity to said certain amount of unbalance;

rotating said tool holder;

measuring an amount of unbalance of said tool holder while said tool holder is rotating;

balancing said tool holder as said tool holder is rotating, thereby providing compensation for at least a portion of said measured amount of unbalance.

6. The method of claim 5 wherein said balancer comprises first and second movable rotors; and a driver adapted to selectively generate an electromagnetic field effective to cause said movable rotors to provide said unbalance compensation.

7. A tool holder of the type adapted for use upon a spindle, said tool holder comprising a generally elongated body having a tool reception portion which is adapted to removably receive a tool and an opposed spindle reception portion which is adapted to receive said spindle, said tool holder and said tool having a certain amount of unbalance, and a balancer which is disposed in relatively close proximity to said certain amount of unbalance and which is adapted to automatically balance said tool while said tool is rotating by use of electrical energy.

* * * * *